(12) United States Patent
Zhang et al.

(10) Patent No.: US 6,683,711 B2
(45) Date of Patent: Jan. 27, 2004

(54) WAVELENGTH SELECTIVE LIGHT SOURCE USING BRAGG-GRATING

(75) Inventors: Jianjun Zhang, Cupertino, CA (US); Peiching Ling, San Jose, CA (US); Jinliang Chen, Saratoga, CA (US); Ming Xu, San Jose, CA (US)

(73) Assignee: Integrated Optics Communications Corporation, Sunnyvale, CA (US)

(*) Notice: Subject to any disclaimer, the term of this patent is extended or adjusted under 35 U.S.C. 154(b) by 0 days.

(21) Appl. No.: 10/329,035

(22) Filed: Dec. 23, 2002

(65) Prior Publication Data

US 2003/0198259 A1 Oct. 23, 2003

Related U.S. Application Data

(63) Continuation-in-part of application No. 10/177,632, filed on Jun. 19, 2002, which is a continuation-in-part of application No. 10/104,273, filed on Mar. 22, 2002.
(60) Provisional application No. 60/373,803, filed on Apr. 19, 2002, and provisional application No. 60/348,927, filed on Oct. 22, 2001.

(51) Int. Cl.$^7$ ................................................. G02F 2/02
(52) U.S. Cl. .................... 359/332; 359/326; 385/24; 372/64; 372/102
(58) Field of Search ...................... 372/64, 98, 321, 372/23, 102; 359/332; 385/24, 37

(56) References Cited

U.S. PATENT DOCUMENTS

| | | | | |
|---|---|---|---|---|
| 5,712,937 A | * | 1/1998 | Asawa et al. | 385/49 |
| 5,949,801 A | | 9/1999 | Tayebati | |
| 6,014,482 A | * | 1/2000 | Laude | 385/31 |
| 6,243,402 B1 | * | 6/2001 | Doerr | 372/20 |
| 6,246,816 B1 | * | 6/2001 | Moore et al. | 385/37 |
| 6,608,715 B2 | * | 8/2003 | Zhang et al. | 359/332 |
| 2002/0006250 A1 | * | 1/2002 | Wedding | 385/24 |
| 2002/0159705 A1 | * | 10/2002 | Naniwae | 385/49 |

OTHER PUBLICATIONS (No Author) "Tunable Lasers: Lasers than can be adjusted to emit one of several different wavelengths," Light Reading, Aug. 1, 2001. http://www.lightreading.com/document.asp?doc_id=3308&print=true (printed Jun. 20, 2002).

(No Author) "Vertical Cavity Surface Emitting Lasers (VCSELs): Lasers that emit light from their surface in contrast with regular 'edge emitters'," Light Reading, Aug. 2001. http://www.lightreading.com/document.asp?doc_id=3307&print=true (printed Jun. 20, 2002).

(No Author) "Distributed Feedback (DFB) Lasers: Lasers giving out a very sharply defined color of light," Light Reading, Aug. 2001. http://www.lightreading.com/document.asp?doc_id=3306&print=true (printed Jun. 20, 2002).

* cited by examiner

*Primary Examiner*—Leon Scott, Jr.
(74) *Attorney, Agent, or Firm*—Perkins Coie LLP

(57) ABSTRACT

A wavelength selective light source is disclosed. The wavelength selective light source comprises a broadband light source producing light having a plurality of wavelengths and a demultiplexer that receives the light and separates at least one of the plurality of wavelengths from said light. Further, a multiplexer is included for coupling the at least one of said plurality of wavelengths into an output waveguide. Finally, a semiconductor optical amplifier is provided that receives the at least one of the plurality of wavelengths from the output waveguide and amplifies the at least one of the plurality of wavelengths.

26 Claims, 18 Drawing Sheets

WAVELENGTH SELECTIVE LIGHT SOURCE USING BRAGG-GRATING

RELATED APPLICATIONS

Priority is hereby claimed under 35 U.S.C. §120 to U.S. Provisional Patent Application Ser. No. 60/348,927 filed. Oct. 22, 2001, U.S. Provisional Patent Application No. 60/373,803 filed Apr. 19, 2002, CIP of U.S. patent application Ser. No. 10/104,273 filed, Mar. 22, 2002, and CIP of U.S. patent application Ser. No. 10/177,632 filed Jun. 19, 2002, each of which is incorporated by reference.

TECHNICAL FIELD

The present invention relates to wavelength selective light sources, and more particularly, to a wavelength selective light source using a switched Bragg-grating.

BACKGROUND

Wavelength-division multiplexed (WDM) networks carry information using multiple wavelengths. WDM systems, as well as test and measurement of WDM systems and components, require a method and apparatus for producing electromagnetic energy at many different frequencies. One method of accomplishing this is to have multiple lasers, each laser manufactured specifically to produce an output at a specific wavelength. Another desirable option is to have a single laser that is tunable to provide an output that has a variable wavelength, depending upon a control signal. These are referred to as multi-frequency lasers or tunable lasers. An example of such is shown in U.S. Pat. No. 6,243,402 to Doerr and U.S. Pat. No. 5,949,801 to Tayebati. These prior art wavelength variable light sources are relatively complex and suffer from various other disadvantages.

DETAILED DESCRIPTION

The present invention describes a method and apparatus for producing light of a selected wavelength for test and measurement of WDM systems and components. In the following description, numerous specific details are provided to provide a thorough understanding of the embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout the specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout the specification are not necessarily all referring to the same embodiment. Furthermore, the particular features, structures, or characteristics may be combined in any suitable manner in one or more embodiments.

Further, although the present invention is described in terms of a WDM system, the apparatus and method of the present invention can equally be applicable to any optical system that utilizes multiple frequencies. Thus, the description below is but one embodiment of the present invention.

Figure 1:
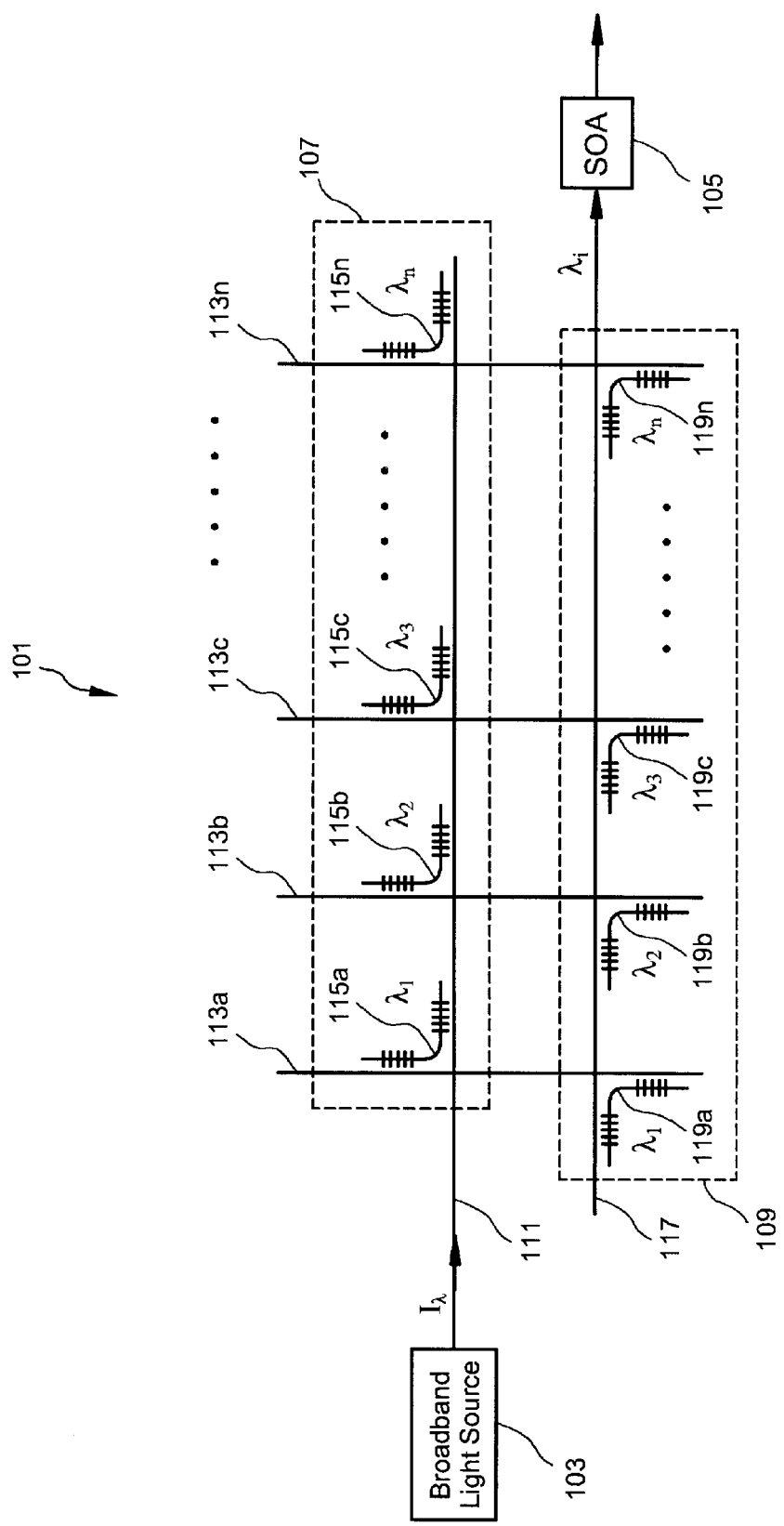
FIG. 1 is a schematic illustration of a wavelength selective light source formed in accordance with the present invention.

FIG. 1 illustrates a wavelength selective light source 101 formed in accordance with the present invention. The wavelength selective light source 101 includes a broadband light source 103, a semiconductor optical amplifier (SOA) 105, a de-multiplexer 107, and a multiplexer 109.

The broadband light source 103 provides light across a spectrum of wavelengths, and more particularly, wavelengths within the band of interest. In one embodiment, the broadband light source 103 provides light in the range of 1520 to 1570 nanometers, also referred to as the "C-band".

Broadband light source 103 provides a broadband light that is transmitted through an input wave guide 111 into the de-multiplexer 107. The de-multiplexer 107, as will be seen below, is operative to selectively demultiplex the broadband light $I_\lambda$ into its various frequency components.

The output of the de-multiplexer 107 is then input to the multiplexer 109, which acts to provide an output to the SOA 105. The SOA 105 is a device that amplifies its input and therefore outputs an amplified version of the input signal.

In many respects, SOA 105 is similar in construction to a conventional semiconductor laser in that it consists of a layer of semiconductor material (known as the active region), sandwiched in between other layers of semiconductors of a different composition. An electrical current is passed through the device and serves to excite electrons in the active region. When photons travel through the active region, this will cause these electrons to lose some of their extra energy in the form of more photons that match the wavelength (or wavelengths) of the initial input. Therefore, an optical signal passing through the active region is amplified and is said to have experienced gain.

Additionally, the semiconductor layers that sandwich the active region are designed to help guide the light through the device. This is achieved through a difference in refractive index from the active region, in much the same way as the refractive index differs between an optical fiber's core and its cladding help to guide light. The SOA 105 is commercially available from companies such as Alcatel, Kamelian, Opto Speed, and others.

With an overview of the wavelength selective light source 101 provided above, more specific discussion is now provided of the components and their specific operation. The de-multiplexer 107 includes an input waveguide 111 and a plurality of intersecting waveguides 113a–n. The intersecting waveguides 113a–n intersect with the input waveguide 111. Disposed at the intersections of the intersecting waveguides 113a–n and the input waveguide 111 are switches 115a–n. The switches 115a–n are Bragg-grating based switches and are of the type disclosed in our co-pending applications noted above and which are herein incorporated by reference in their entirety. However, a brief description is further below.

The light from the broadband light source 103 is provided to the input waveguide 111 such that it propagates along the input waveguide 111. At the intersections of the input waveguide 111 and the intersecting waveguides 113a–n, the switches 115a–n are selectively capable (when activated) of redirecting light of a specific wavelength into the associated intersecting waveguide 113a–n.

Figure 2A:
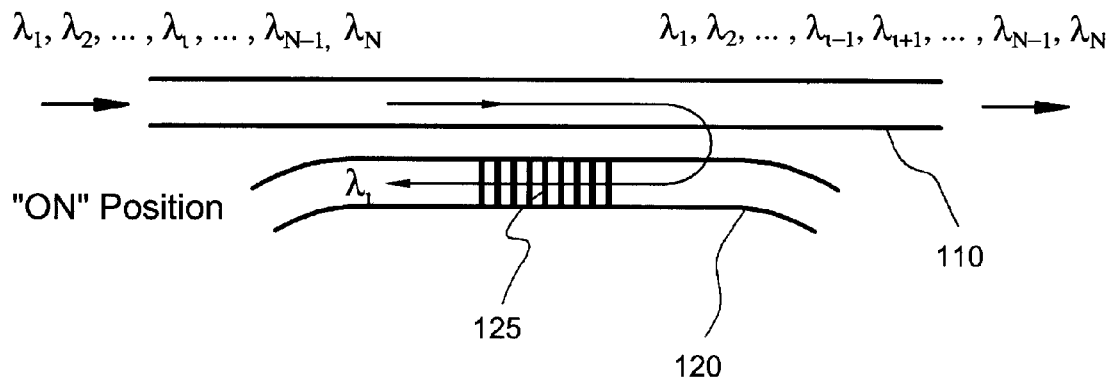
FIGS. 2A to 2F are schematic diagrams showing the on/off switching functions of a wavelength selective bridge waveguide of this invention.
Figure 2B:
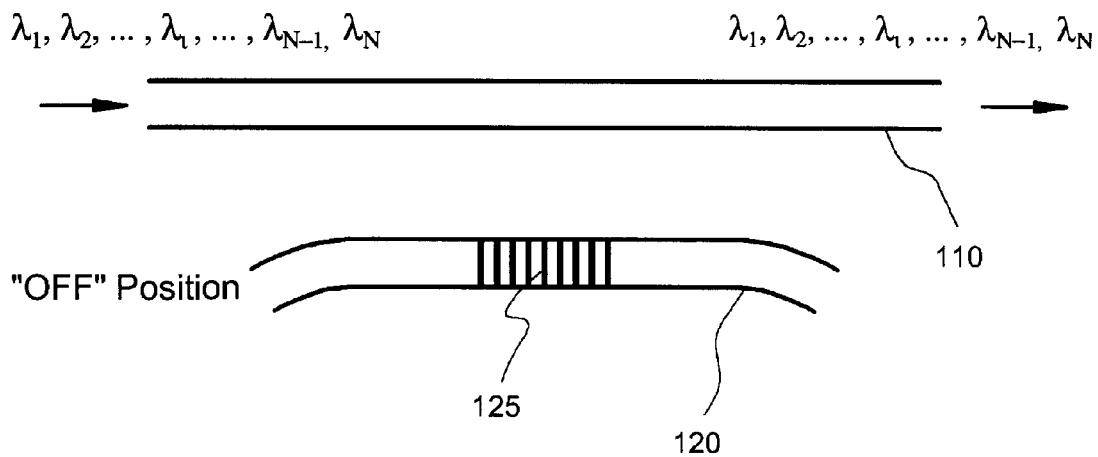

FIGS. 2A and 2B are schematic diagrams for showing the principles of operation of the switches 115a–n. A multiplexed optical signal is transmitted in an optical waveguide 110 over N multiplexed wavelengths $\lambda_1, \lambda_2, \lambda_3, \ldots, \lambda_N$ where N is a positive integer. This is a general characterization of a plurality of wavelengths carried by the waveguide 110. In the embodiment of FIG. 1, the waveguide 110 is equivalent to the input waveguide 111 and the optical signals $\lambda_1, \lambda_2, \lambda_3, \ldots, \lambda_N$ are equivalent to $I_\lambda$.

In FIG. 2A, a wavelength selective bridge waveguide 120 is moved to an on-position and coupled to the waveguide 110. An optical signal with a central wavelength $\lambda_i$ particular to the Bragg gratings 125 disposed on the bridge waveguide 120 is guided into the wavelength selective bridge waveguide 120. The remaining wavelengths $\lambda_1, \lambda_2, \ldots, \lambda_{i-1}, \ldots, \lambda_{i+1}, \ldots, \lambda_N$ are not affected and continues to propagate over the waveguide 110. The Bragg gratings 125 have a specific pitch for reflecting the optical signal of the selected wavelength $\lambda_i$ onto the wavelength selective bridge waveguide 120.

In FIG. 2B, the wavelength selective bridge waveguide 120 is moved away from the waveguide 110 to a "bridge-off" position. There is no coupling between to the waveguide 110 and therefore no "detoured signal" entering into the bridge waveguide 120. The entire multiplexed signal over wavelengths $\lambda_1, \lambda_2, \lambda_3, \ldots, \lambda_N$ continue to propagate on the waveguide 110.

Figure 2C:
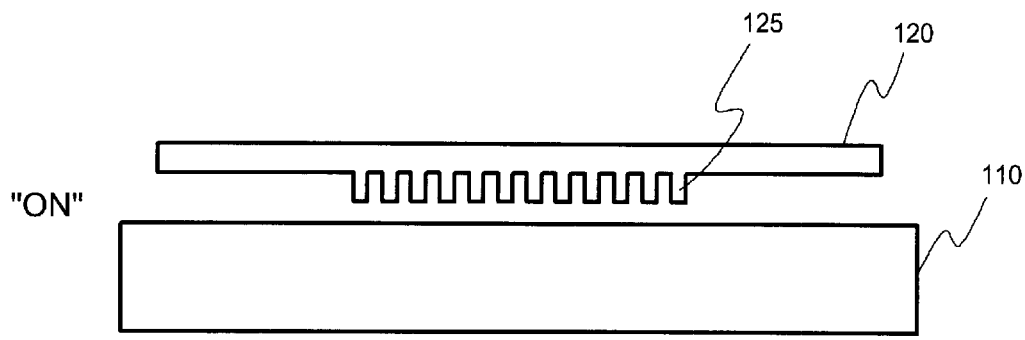
Figure 2D:
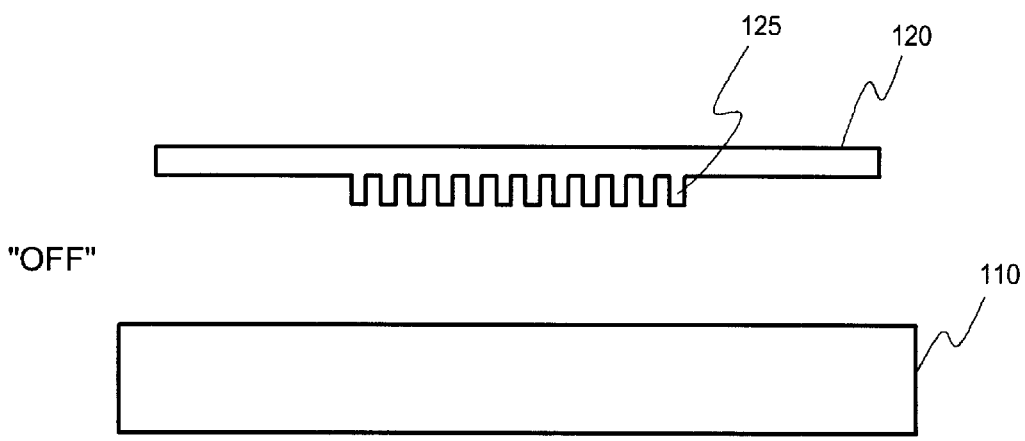
Figure 2E:
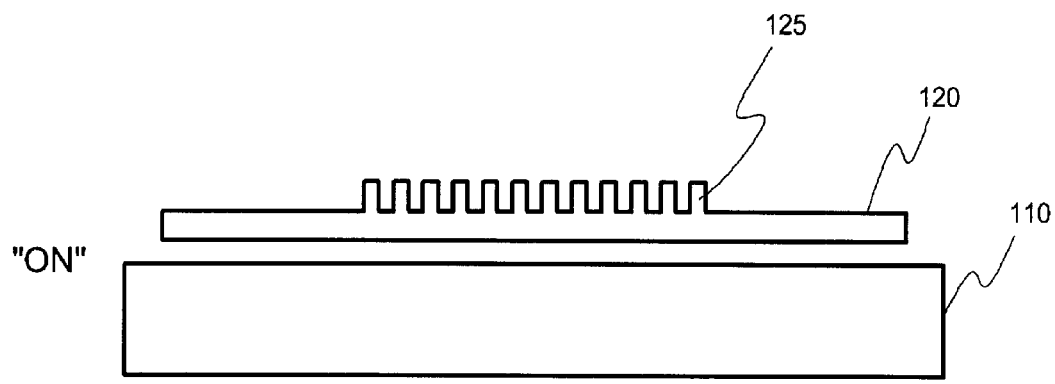
Figure 2F:
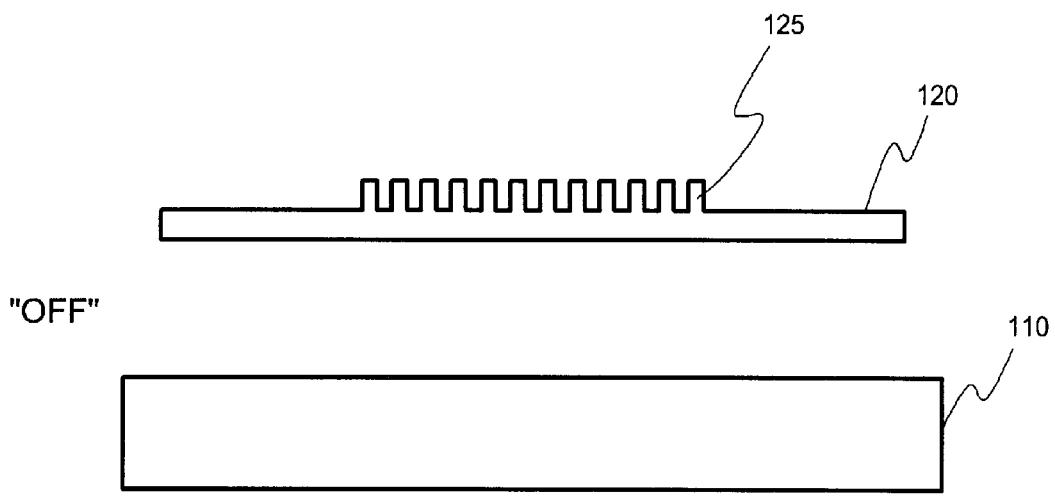

FIGS. 2C and 2D illustrate a detailed configuration of the Bragg-gratings formed on the wavelength selective bridge waveguide 120. The pitch between the gratings 125 defines a selected wavelength that will be reflected onto the bridge waveguide 120 when the wavelength selective bridge waveguide is at an on-position coupled to the waveguide 110 as that shown in FIG. 2A. Furthermore, as shown in FIGS. 2E and 2F, the Bragg gratings 125 may be formed on a surface of the bridge waveguide 120 opposite the waveguide 110. Again, as the bridge waveguide 120 is moved to an "on" position coupled to the waveguide 110 in FIGS. 2C and 2E, an optical signal of a selected wavelength defined by the pitch between the Bragg gratings is coupled into the bridge waveguide 120. When the bridge waveguide 120 is moved to an "off" position in FIGS. 2D and 2F, the bridge waveguide 120 is completely decoupled and there is no "detoured signal" into the bridge waveguide 120.

Figure 3A:
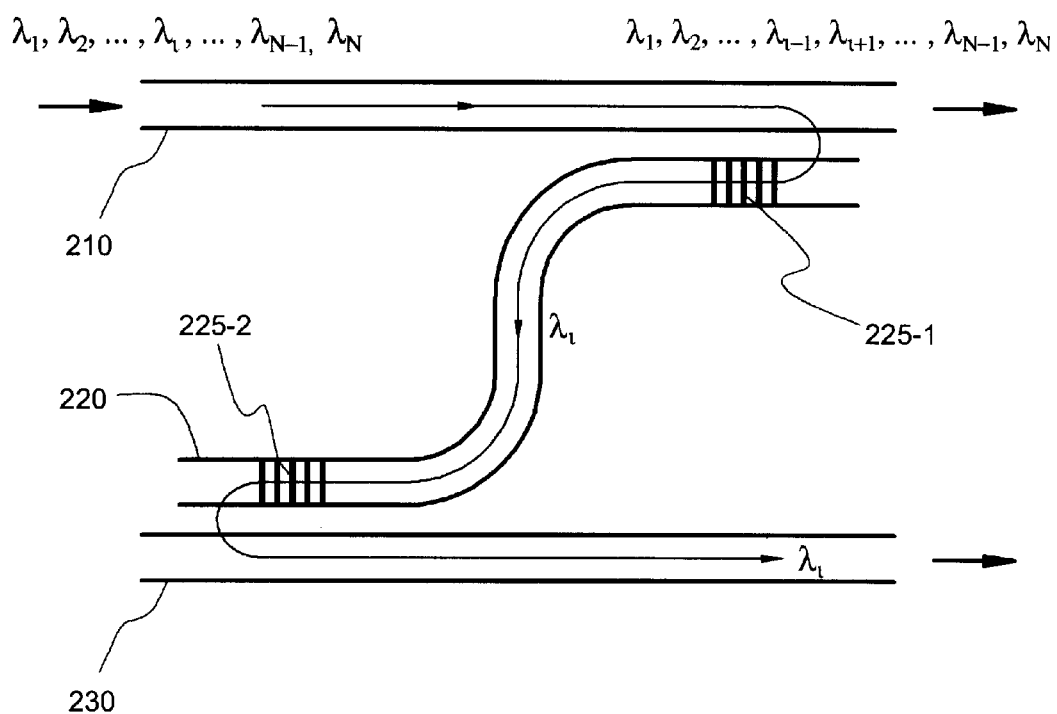
FIGS. 3A to 3B are cross sectional views for showing coupling configurations of a wavelength-selective bridge waveguide coupled between a waveguide and an outbound waveguide.

FIG. 3A shows a wavelength selective bridge waveguide 220 coupled between a bus waveguide 210 and a second waveguide 230. A multiplexed optical signal is transmitted in a bus waveguide 210 over N multiplexed wavelengths $\lambda_1, \lambda_2, \lambda_3, \ldots, \lambda_N$ where N is a positive integer. The wavelength selective bridge waveguide 220 has a first set of Bragg gratings disposed on a first "bridge on-ramp segment" 225-1 for coupling to the bus waveguide 210. An optical signal with a central wavelength $\lambda_i$ particular to the Bragg gratings 225 disposed on the bridge waveguide 220 is guided through the first bridge ramp segment 225-1 to be reflected into the wavelength selective bridge waveguide 220.

The remainder optical signals of the wavelengths $\lambda_1, \lambda_2, \lambda_3, \lambda_{i-1}, \lambda_{i+1}, \ldots, \lambda_N$ are not affected and continues to transmit over the waveguide 210. The Bragg grating 225 has a specific pitch for reflecting the optical signal of the selected wavelength $\lambda_i$ onto the wavelength selective bridge waveguide 220. The wavelength selective bridge waveguide 220 further has a second set of Bragg gratings as a bridge off-ramp segment 225-2 coupled to an outbound waveguide 230. The second set of Bragg gratings has a same pitch as the first set of Bragg gratings. The selected wavelength $\lambda_i$ is guided through the bridge off-ramp segment 225-2 to be reflected and coupled into the outbound waveguide 230. The bridge waveguide 220 can be an optical fiber, waveguide or other optical transmission medium connected between the bridge on-ramp segment 225-1 and the bridge off-ramp segment 225-2.

Figure 3B:
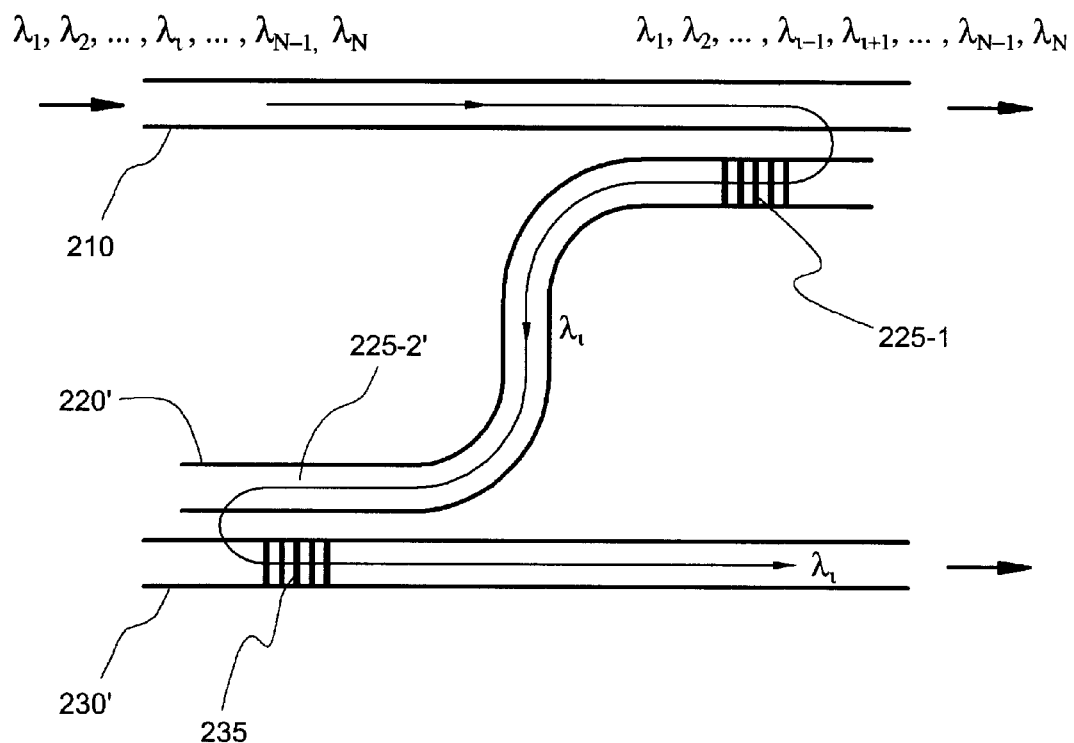

FIG. 3B shows another wavelength selective bridge waveguide 220' is coupled between a bus waveguide 210 and a second waveguide 230'. A multiplexed optical signal is transmitted in a bus waveguide 210 over N multiplexed wavelengths $\lambda_1, \lambda_2, \lambda_3, \ldots, \lambda_N$ where N is a positive integer. The wavelength selective bridge waveguide 220' has a first set of Bragg gratings disposed on a first "bridge on-ramp segment" 225-1 for coupling to the bus waveguide 210. An optical signal with a central wavelength $\lambda_i$ particular to the Bragg gratings 225-1 disposed on the bridge waveguide 220' is guided through the first bridge ramp segment 225-1 to be reflected into the wavelength selective bridge waveguide 220'.

The remainder optical signals of the wavelengths $\lambda_1, \lambda_2, \lambda_3, \lambda_{i-1}, \lambda_{i+1}, \ldots, \lambda_N$ are not affected and continues to transmit over the waveguide 210. The Bragg gratings 225-1 have a specific pitch for reflecting the optical signal of the selected wavelength $\lambda_i$ into the wavelength selective bridge waveguide 220'. The wavelength selective bridge waveguide 220' further has a bridge off-ramp segment 225-2' coupled to an outbound waveguide 230' near a section 235 of the outbound waveguide 230. The section 235 on the outbound waveguide 230' has a second set of Bragg gratings having a same pitch as the first set of Bragg gratings. The bridge waveguide 220 can be an optical fiber, waveguide or other optical transmission medium connected between the bridge on-ramp segment 225-1 and the bridge off-ramp segment 225-2'.

Figure 4A:
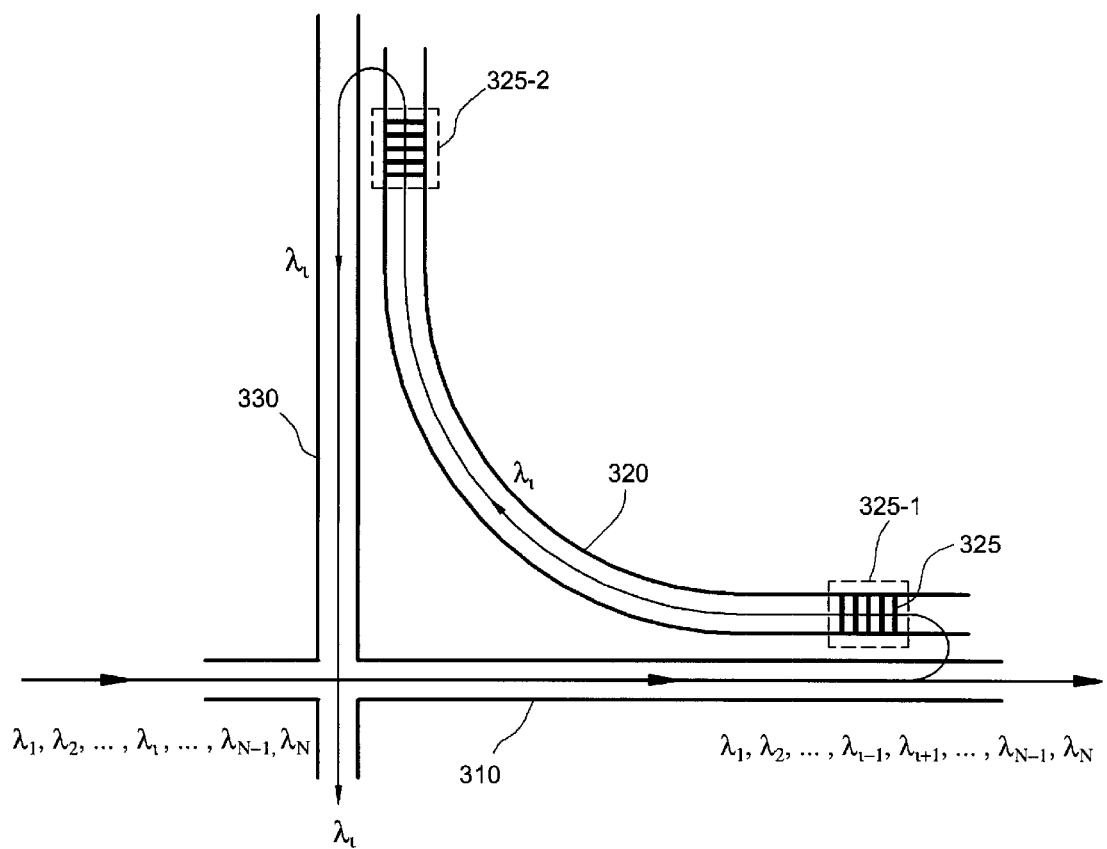
FIGS. 4A and 4B are functional diagrams for showing wavelength selective bridge waveguides acting as a switch that is coupled between the intersecting waveguides for switching and re-directing optical transmission of a selected wavelength.

FIG. 4A shows a wavelength selective bridge waveguide 320 is coupled between a bus waveguide 310 and an intersecting waveguide 330. Indeed, the following description shows the operation of the switches 115a–n at the intersection of the input waveguide 111 and the intersecting waveguides 113a–n. A multiplexed optical signal is transmitted in a bus waveguide 310 over N multiplexed wavelengths $\lambda_1, \lambda_2, \lambda_3, \ldots, \lambda_N$ where N is a positive integer. The wavelength selective bridge waveguide 320 (also referred to as the switch 115 of FIG. 1) has a first set of Bragg gratings disposed on a first "bridge on-ramp segment" 325-1 for coupling to the bus waveguide 310. An optical signal with a central wavelength $\lambda_i$ particular to the Bragg gratings 325 disposed on the bridge waveguide 320 is guided through the first bridge ramp segment 325-1 to be reflected into the wavelength selective bridge waveguide 320. The remainder optical signals of the wavelengths $\lambda_1, \lambda_2, \lambda_3, \ldots, \lambda_{i-1}, \lambda_{i+1}, \ldots, \lambda_N$ are not affected and continues to propagate over the waveguide 310.

The Bragg gratings 325 have a specific pitch for reflecting the optical signal of the selected wavelength $\lambda_i$ into the wavelength selective bridge waveguide 320. The wavelength selective bridge waveguide 320 further has a second set of Bragg gratings 325 as a bridge off-ramp segment 325-2 coupled to an outbound waveguide 330. The bridge waveguide 320 can be an optical fiber, waveguide or other optical transmission medium connected between the bridge on-ramp segment and the bridge off-ramp segment 325-2.

Figure 4B:
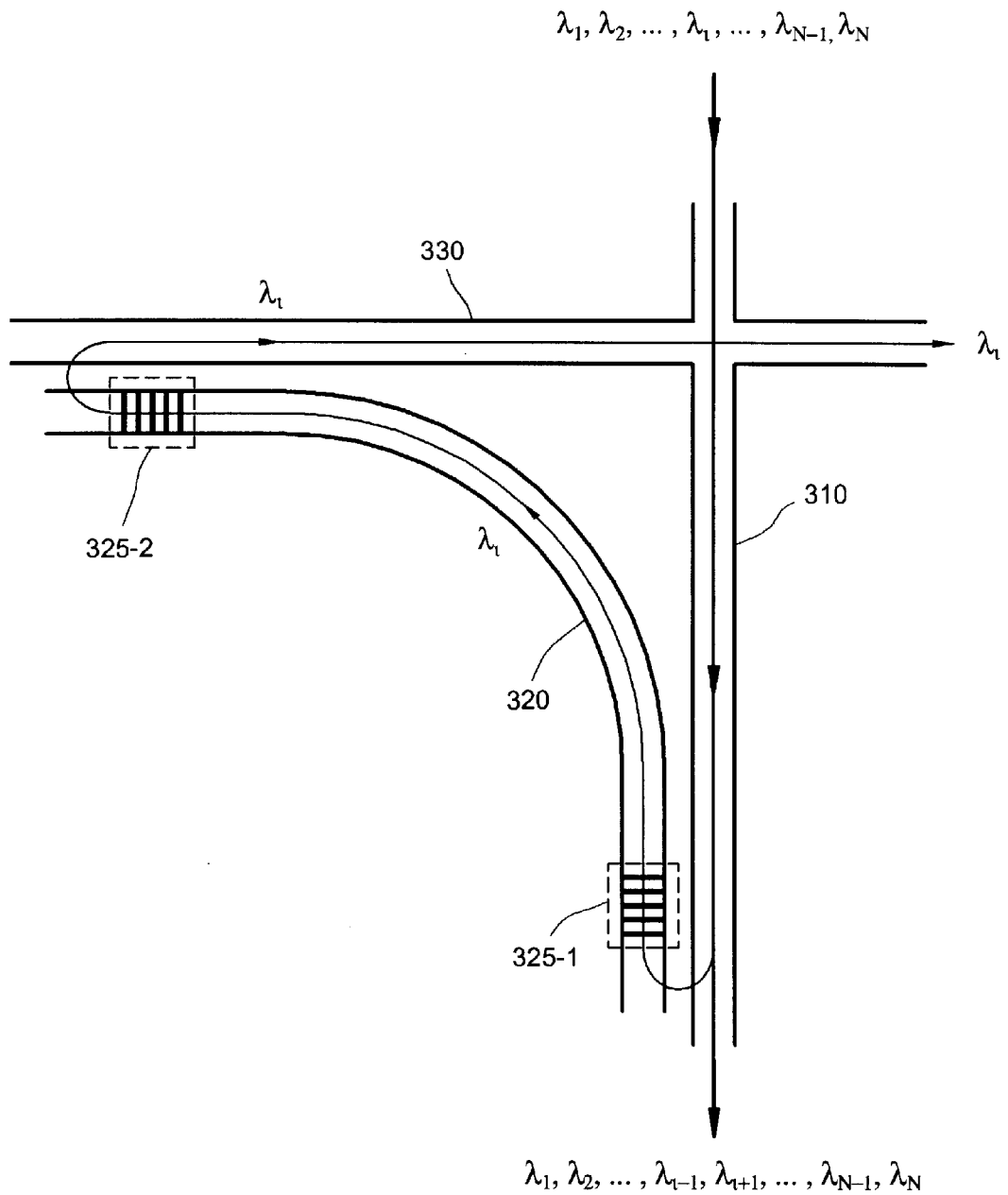

FIG. 4B is another embodiment with the bus waveguide 310 disposed in a vertical direction and an interesting outbound waveguide 330 disposed along a horizontal direction. As will be seen below, this embodiment of the switch is used in the multiplexer 109.

Figure 5A:
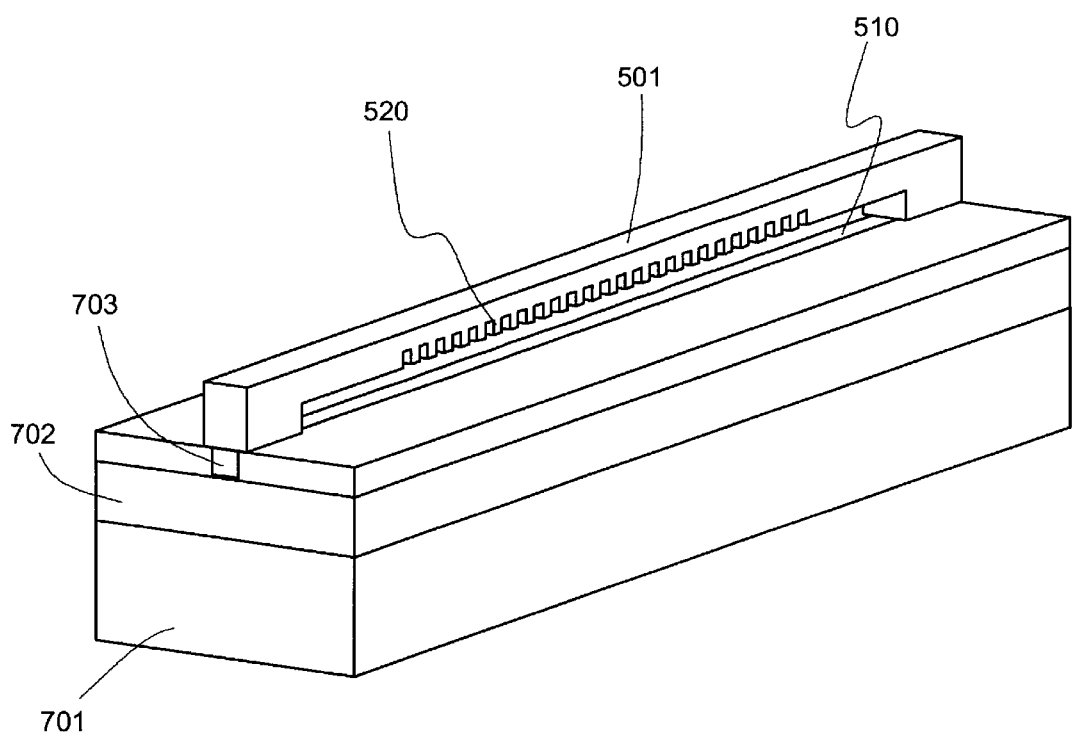
FIG. 5A illustrates a bridge-beam type switch with integrated Bragg grating element.

The structures shown in FIGS. 2–4 can be implemented as MEMS devices. For example, FIG. 5A depicts an illustrative embodiment of bridge-beam type switchable grating structure with integrated Bragg grating elements. The structure is fabricated using MEMS technology and semiconductor processing described below. On the substrate 701, a cladding layer 702 is formed first. Then the core layer 703 is deposited and patterned to form waveguide core that is shown more clearly in the cross-sectional view FIG. 5B. The bridge beam 501 is a waveguide consisting of integrated Bragg gratings 520 and an embedded electrode. When this waveguide, called a bridge waveguide, is electrostatically bent close enough to a waveguide 510, the wavelength that meets the Bragg phase-matching condition is coupled into the bridge waveguide. Through the bridge waveguide, the selected wavelength can then be directed into a desired output waveguide.

Figure 5B:
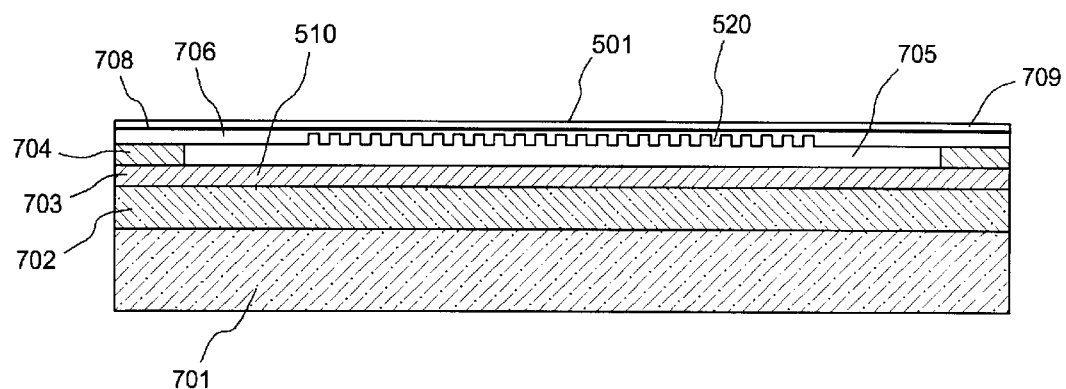
FIG. 5B illustrates the cross-sectional structure of a bridge-beam type switch in which the grating coupling is normally off.
Figure 5C:
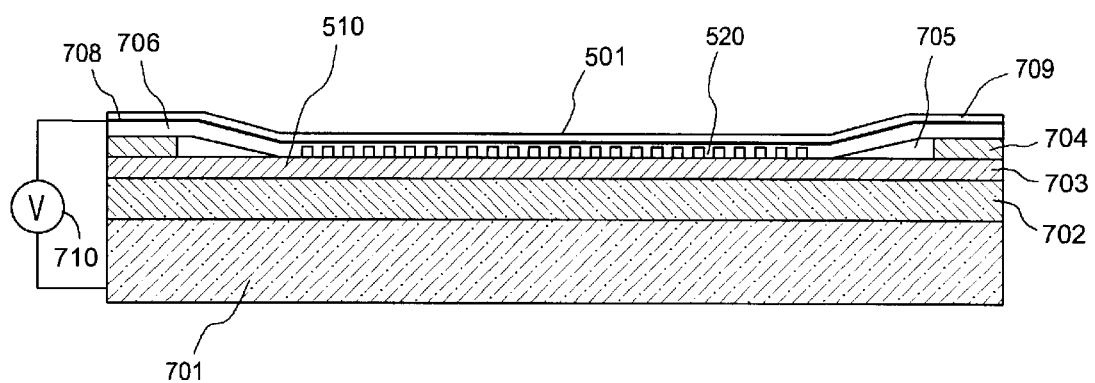
FIG. 5C shows the grating element of a bridge-beam type switch in the "on" position.

FIG. 5B shows the cross-sectional view of bridge-beam type switchable grating structure with integrated Bragg grating elements. After the cladding layer 702 and core layer 703 are deposited, a sacrificial layer is deposited after another cladding layer 704 is deposited and patterned. After the sacrificial layer is patterned and the grating grooves are etched on sacrificial layer, another cladding layer 706 is deposited. The electrode layer 708 and the insulation layer 709 are deposited subsequently. The etching process starts from layer 709 through into layer 704 after patterning. Finally the sacrificial layer is etched to form the air gap 705 between waveguide 510 and grating element 520. In an alternative way, the waveguide and the grating element can be fabricated on its own substrate first. Then they are aligned and bonded together to make the same structure shown in FIG. 7B. Due to the existence of air gap 705, the grating is off when the grating element is at normal position (no voltages applied). Referring to FIG. 5C, when an appropriate voltage 710 is applied between the electrode 708 and substrate 701, the grating element 520 is deflected toward waveguide 510 by the electrostatic force. The grating is turned "on" when the grating element 520 moving close enough to input waveguide 510.

Figure 6A:
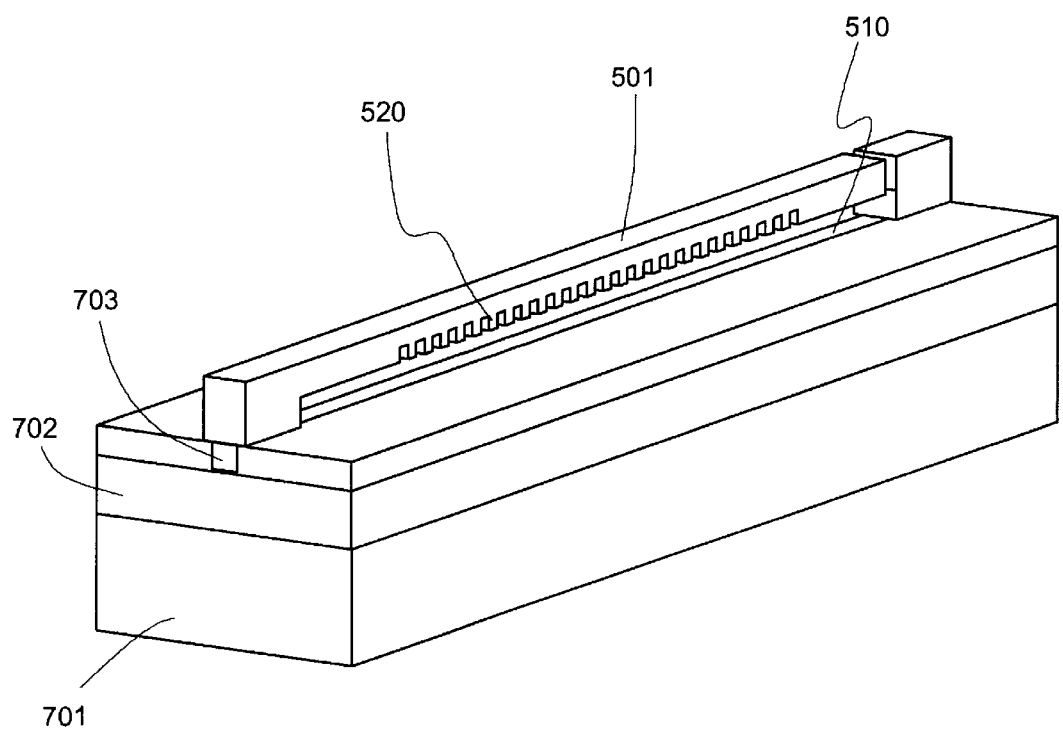
FIG. 6A illustrates a cantilever-beam type switch with integrated Bragg grating element.
Figure 6B:
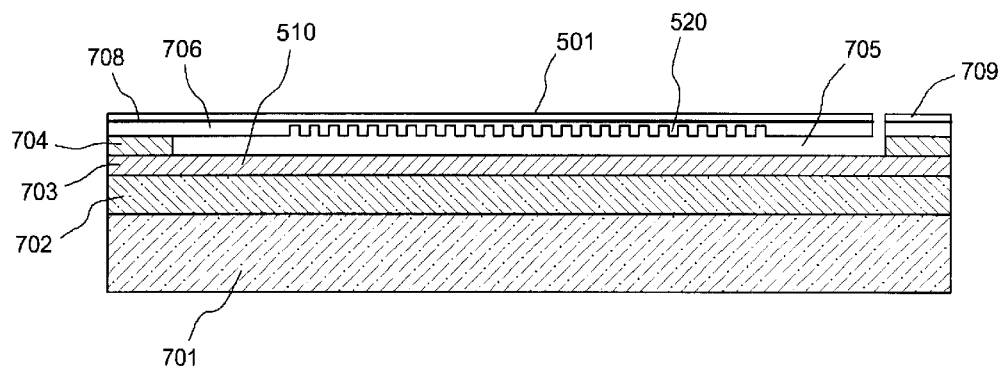
FIG. 6B illustrates the cross-sectional structure of a cantilever-beam type switch in which the grating coupling is normally off.
Figure 6C:
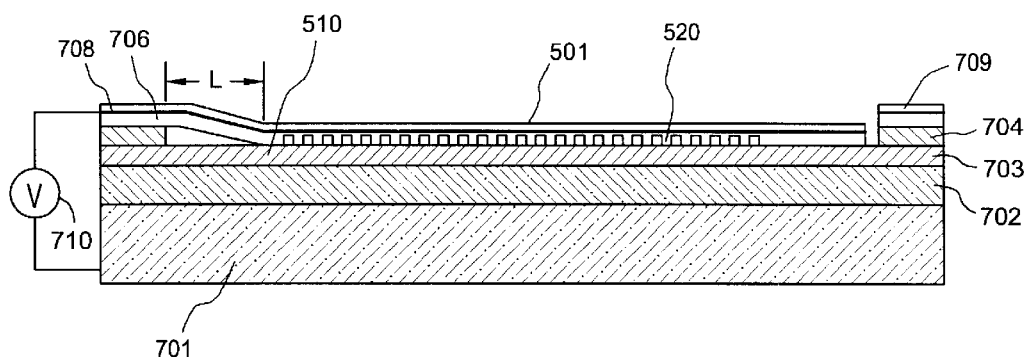
FIG. 6C shows the grating element of a cantilever-beam type switch in the "on" position.

FIG. 6A depicts an illustrative embodiment of cantilever-beam type switchable grating structure with integrated Bragg grating elements. The structure is fabricated using similar MEMS technology and semiconductor processing described above. In this arrangement, the stress and strain in the grating segment 520 can be reduced greatly. Therefore, the lifetime of grating element can be improved. FIG. 6B shows the cross-sectional structure of a cantilever-beam type switch. Referring to FIG. 6C, the cantilever beam 501 is deflected by the electrostatic force. Applying voltages 710 between substrate 701 and electrode 708 controls the electrostatic force applied to the cantilever beam 501. Therefore, by controlling the applying voltages 710 the wavelength-selective optical function can be activated through varying the degree of coupling between Bragg grating 520 and input waveguide 510.

An adequate beam length L is required in order to deflect the beam 501 to certain displacement within the elastic range of the material. For example, a 500 um long cantilever Si beam with the section of 12 um×3 um can be easily deformed by 4 um at the tip of the beam. Another major advantage for the cantilever beam structure is that the movable beam 501 can be shorter and therefore reduce the size of the switch.

Figure 7A:
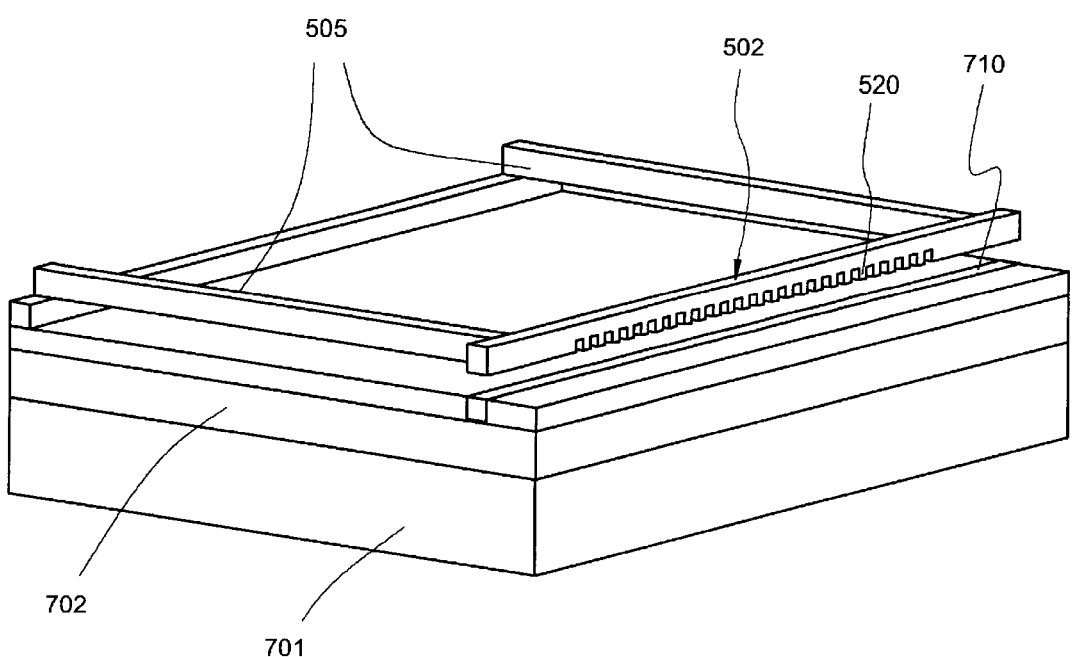
FIG. 7A illustrates a dual cantilever-beam type switch with integrated Bragg grating element.
Figure 7B:
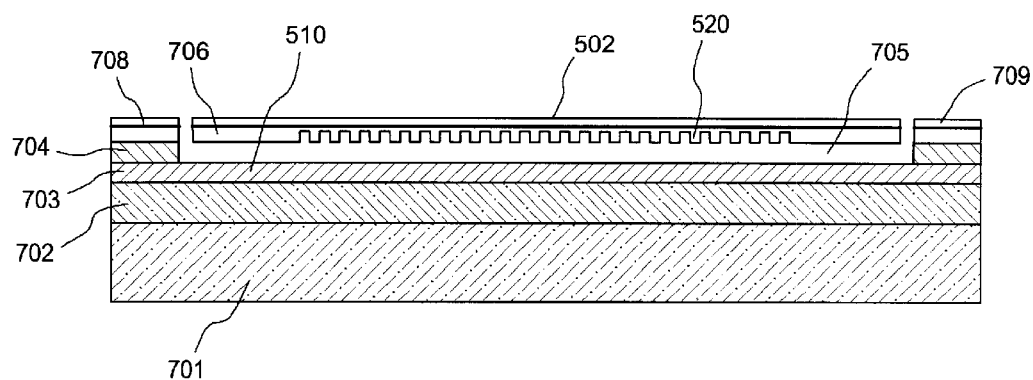
FIG. 7B illustrates the cross-sectional structure of a dual cantilever-beam type switch in which the grating coupling is normally off.
Figure 7C:
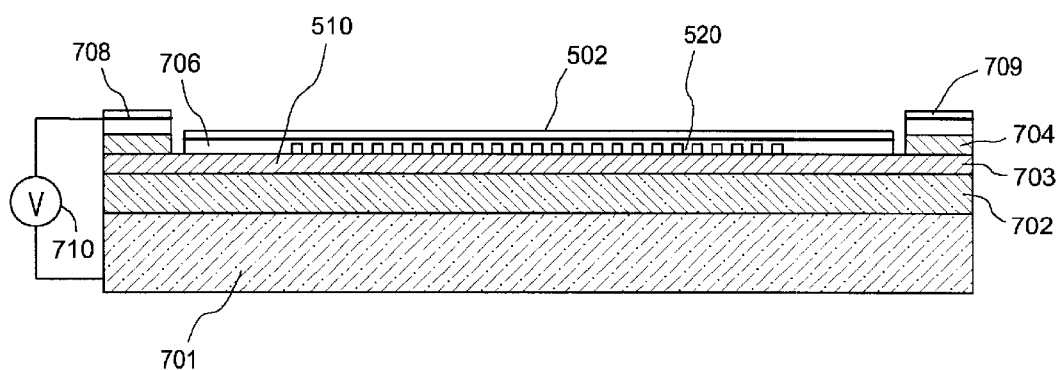
FIG. 7C shows the grating element of a dual cantilever-beam type switch in the "on" position.

FIG. 7A illustrates another embodiment of the switch. This is a dual cantilever beam type switch. In this structure the grating element is fabricated on a movable beam 502, which is supported by two cantilever beams 505. In this arrangement, the stress and strain in the grating segment can be eliminated almost completely if the electrode pattern is also located appropriately. Another advantage is that the material of cantilever beams 505 does not necessarily have to be the same as the material of grating element 520. For instance, cantilever beams 505 can be made of metal to improve the elasticity of the beams. In addition, the anchor structure can be in different forms, e.g. MEMS springs or hinges. Therefore, a large displacement and smaller sized grating element is more achievable in this structure. FIGS. 7B and 7C shows the cross-sectional structure of a dual cantilever-beam type switch. Similar to the operations described above, the grating element 520 is moved towards the waveguide 510 by applying voltages 710 to electrode 708 and substrate 701.

Figure 8:
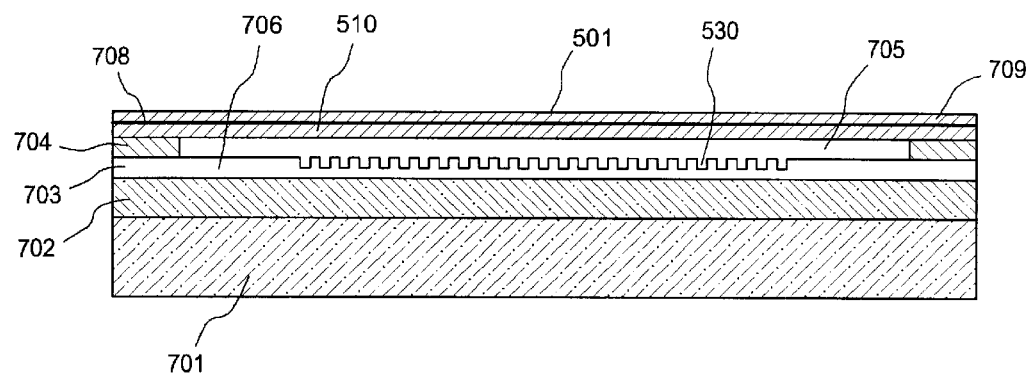
FIG. 8 illustrates the cross-sectional structure of another embodiment of the grating element.

FIG. 8 shows an alternate structure of the grating where the grating is located on the bottom side, or the surface side of the substrate. The structure can be fabricated by applying semiconductor processing technology to form the Bragg gratings 530 on the core layer 703 while positioning the movable beam 501 and the Bragg gratings 530 to have a small gap 705 from the waveguide 510. Similar to the operations described above, an electric conductive layer 708 is formed on the movable beam 501 for applying the voltage to assert an electrostatic force to bend the movable beam 501. The electrostatic force thus activates the movable switch by coupling a waveguide 706 to waveguide 510. The Bragg gratings 530 thus carry out a wavelength-selective optical switch function.

Figure 9:
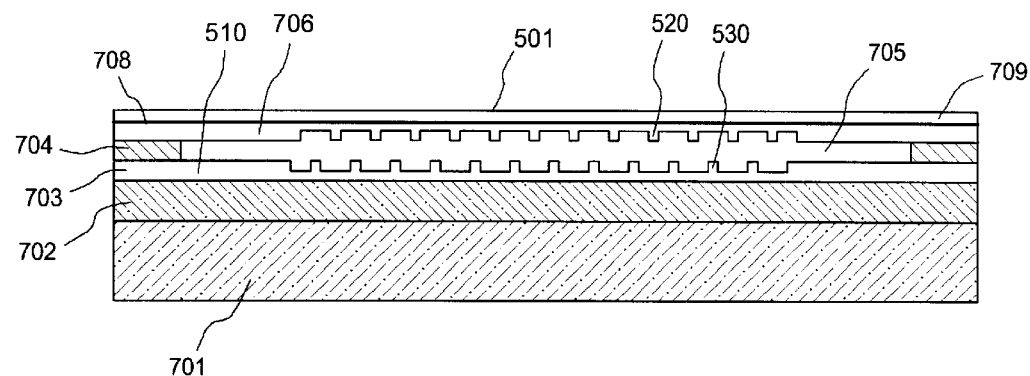
FIG. 9 illustrates an embodiment where the grating elements are fabricated on both the substrate and the movable beam.

FIG. 9 is also another alternate structure of switchable gratings. In this structure the grating is located on both top and bottom sides. Similar semiconductor processing technology can be used to form the Bragg gratings 520 on the movable beam 501 and the Bragg gratings 530 on the waveguide 510. A small gap is formed between waveguides 510 and 706. An electric conductive layer 708 is also formed on the movable beam 501 for applying the voltage to assert an electrostatic force to bend the movable beam 501. Similar to the operations described above, the electrostatic force thus activates the switch by coupling the selected wavelength from waveguide 510 to waveguide 706.

Figure 10:
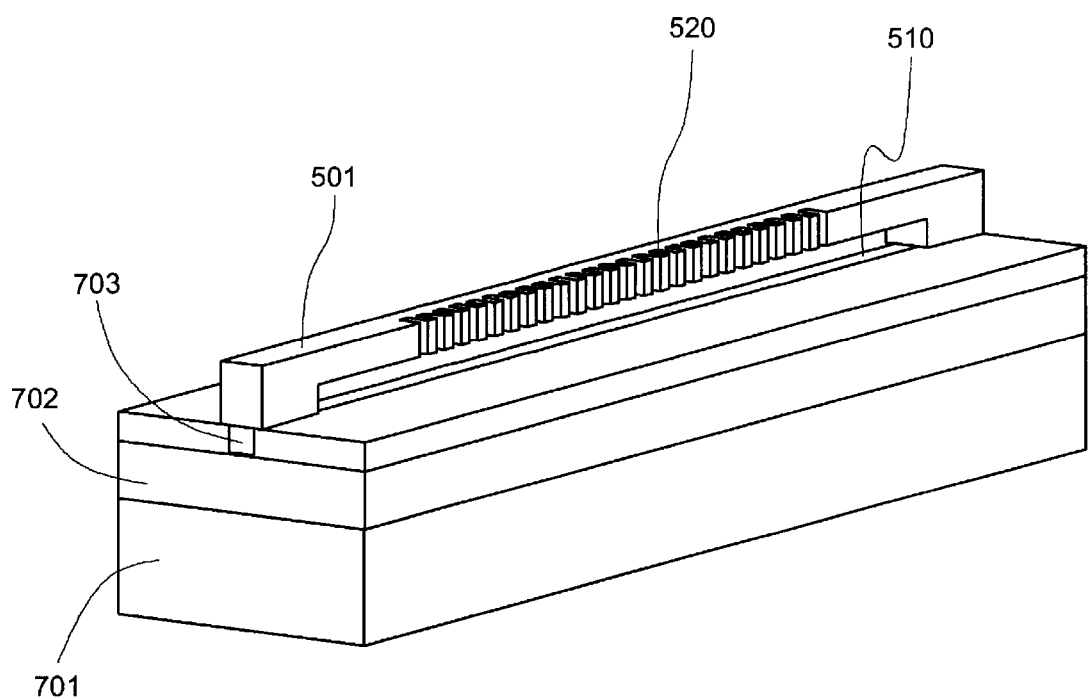
FIG. 10 illustrates an embodiment where the grating elements are fabricated on the horizontal sides of the movable beam.

In the structures described above, the grating element is located faced up or down to the substrate. However, the grating element can also be fabricated on the sides of the waveguide, as illustrated in FIG. 10. In this embodiment, the gratings 520 are fabricated on the horizontal sides of the movable beam 501 and the rest of the structure are similar to those structures described above and all the wavelength-selective functions and operations are also similar to those described above. In addition, by rearranging the pattern of electrode, the grating structure can also be made on the top side of the cantilever or bridge beams. This structure may provide a cost advantage in manufacturing.

Figure 11A:
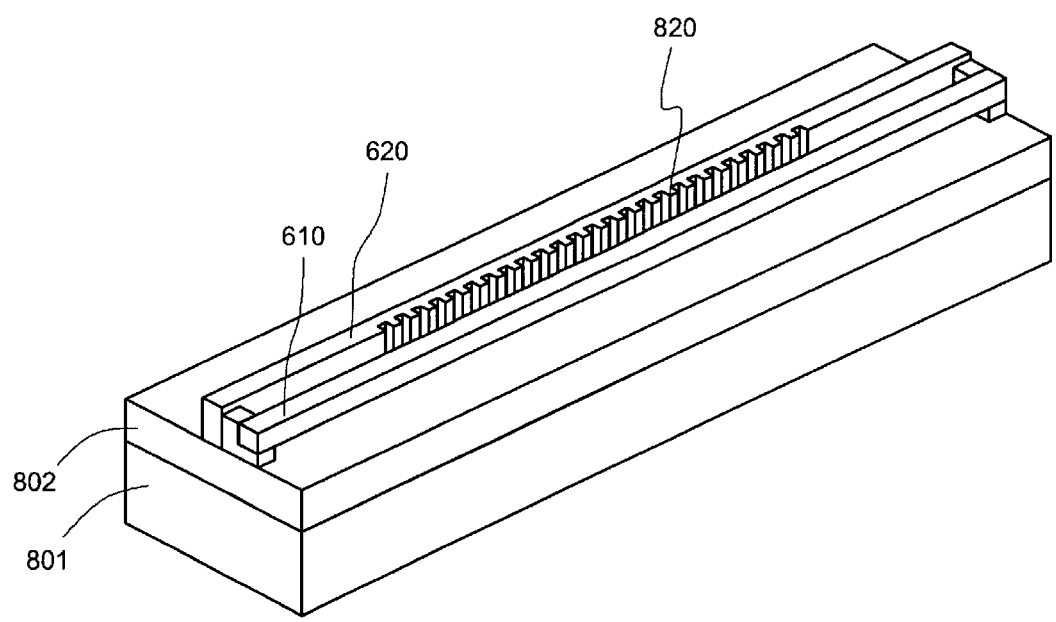
FIGS. 11A and 11B illustrate a grating element where the waveguides are both fabricated on the same surface of the substrate.
Figure 11B:
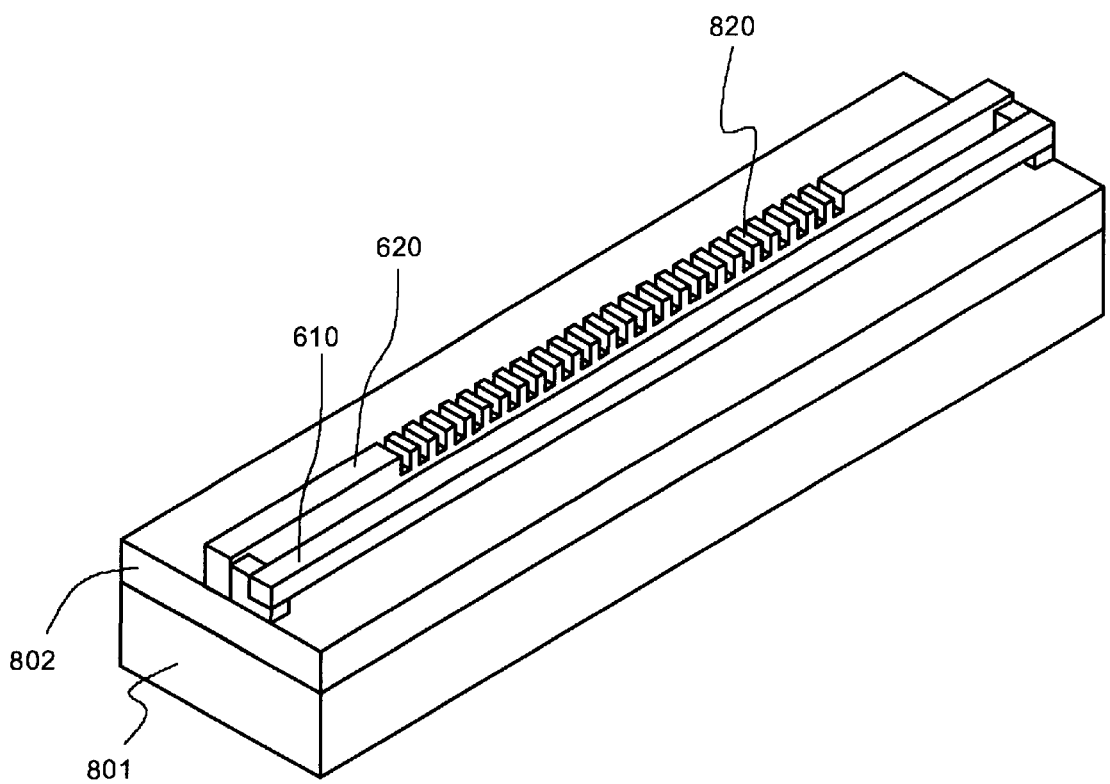

FIG. 11A shows another structure of switchable gratings. Instead of arranging the coupling waveguides as several vertical layers supported on a semiconductor substrate as shown above, the coupling waveguides 610 and 620 are formed as co-planar on a same cladding layer 802, supported on a semiconductor substrate 801. The movable waveguide 610 and coupling waveguide 620 have their own embedded electrodes, similar to those described above. Again, the Bragg gratings 820 can be formed on one or both of the waveguides 610 and 620 as described above. When electrostatic voltages are applied between these electrodes, movable waveguide 610 is moved towards waveguide 620 and thus activate the optical switch. FIG. 11B shows another structure with the gratings 820 facing upward.

With the switches 115*a–n* described, the operation of the remaining elements of the wavelength selective light source 101 will next be discussed. Returning to FIG. 1, thus, each of the switches 115*a–n* is operable to selectively extract from the input waveguide 111 one of the frequencies ($\lambda_1 - \lambda_n$) contained in the broadband light output by the broadband light source 103.

Specifically, in FIG. 1, it can be seen that the intersecting waveguide 113*a* contains the optical signal carried by $\lambda_1$. Similarly, the intersecting waveguide 113*b* carries the signal carried by wavelength $\lambda_2$. Intersecting waveguide 113*c* carries the signal carried on wavelength $\lambda_3$. Finally, intersecting waveguide 113*n* carries the signal carried on wavelength $\lambda_n$. It should be noted that the switches 115*a–n* in the de-multiplexer 107 are selectively activated as desired. Thus, the switch 115*a* may be activated to switch the signal carried on wavelength $\lambda_1$ to the intersecting waveguide 113*a*. Alternatively, the switch 115*a* may be deactivated such that the intersecting waveguide 113*a* does not carry the signal on wavelength $\lambda_1$. In that situation, the input waveguide 111 continues to carry the signal on wavelength $\lambda_1$. Thus, the de-multiplexer 107 can selectively extract one or more wavelengths from the broadband input to the de-multiplexer 107.

Typically, for most applications, the wavelength selective light source 101 is only required to output light of a single frequency. In such a situation, only one of the switches 115*a–n* is activated. The remaining switches are deactivated. However, in some other applications, it may be desirable to have the wavelength selective light source 101 output two or more wavelengths of light, in which case two or more switches 115*a–n* should be activated.

The intersecting waveguides 113*a*–113*n* are all input into the multiplexer 109. Once input into the multiplexer 109, the intersecting waveguides 113*a*–113*n* further intersect an output waveguide 117. Located at the intersection of the intersecting waveguides 113*a*–113*n* with the output waveguide 117 are switches 119*a*–119*n*. These switches, in one embodiment, are fixed and operate to redirect the signal carried on the intersecting waveguides 113*a*–113*n* into the output waveguide 117. In an alternative embodiment, the switches 113*a*–113*n* may also be selectively activated to provide another configurable option to the user. The switches 119*a*–119*n* are similar to that of the switches 115*a*–115*n*.

The output waveguide 117 is then provided as the input to the SOA 105. The SOA 105 is then operable to amplify the signal. In this way, by selectively switching a selected frequency using the demultiplexer 107, a broadband light source 103 can be used as a wavelength selective light source, in conjunction with the SOA 105.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A wavelength selective light source comprising:
    a broadband light source producing light having a plurality of wavelengths;
    a demultiplexer that receives the light and separates at least one of said plurality of wavelengths from said light;
    a multiplexer for coupling said at least one of said plurality of wavelengths into an output waveguide;
    a semiconductor optical amplifier that receives said at least one of said plurality of wavelengths from said output waveguide, said semiconductor optical amplifier amplifying said at least one of said plurality of wavelengths and outputting an amplified output signal without modulation by a control signal.

2. The wavelength selective light source of claim 1 wherein said broadband light source provides light in the range of 1520 to 1570 nanometers.

3. The wavelength selective light source of claim 1 wherein said demultiplexer comprises:
    an input waveguide for carrying the light from said broadband light source;
    a plurality of intersecting waveguides intersecting with said input waveguide to form a plurality of intersections; and
    a plurality of switches disposed on said plurality of intersections.

4. The wavelength selective light source of claim 3 wherein said plurality of switches disposed on said plurality of intersections selectively switches one of said plurality of wavelengths into an associated intersecting waveguide and for selectively transmitting the remaining ones of said plurality of wavelengths.

5. The wavelength selective light source of claim 3 wherein said switches comprise Bragg gratings that have a periodicity suitable for switching said one of said plurality of wavelengths from said input waveguide into an associated one of said intersecting waveguide.

6. The wavelength selective light source of claim 3 wherein said switches can be engaged or disengaged to said input waveguide and an associated one of said intersecting waveguides.

7. The wavelength selective light source of claim 1 wherein said demultiplexer comprises:

an input waveguide carrying the light from said broadband light source;

an intersecting waveguide disposed proximal to said input waveguide, said intersecting waveguide or said input waveguide having a Bragg grating formed thereon, said input waveguide and said intersecting waveguide separated by a gap distance when in an off state; and means for displacing said Bragg grating sufficiently towards said input waveguide when in an on state such that said Bragg grating can selectively extract one of said plurality of wavelengths.

8. The wavelength selective light source of claim 7 wherein said Bragg grating has a periodicity suitable for filtering said one of said plurality of wavelengths into said intersecting waveguide.

9. The wavelength selective light source of claim 7 wherein said means for displacing comprises an electrically controllable microelectromechanical system (MEMS).

10. The wavelength selective light source of claim 7 wherein said means for displacing is an electrostatic moving means for moving said Bragg grating for activating said Bragg grating.

11. A method for outputting an optical signal of a selected wavelength comprising:

providing a broadband light source that outputs light having a plurality of wavelengths, including said selected wavelength;

demultiplexing said light using a demultiplexer to extract said selected wavelength; and only after demultiplexing said light, then amplifying said selected wavelength into an optical signal.

12. The method of claim 11 wherein said broadband light source provides light in the range of 1520 to 1570 nanometers.

13. The method of claim 11 further including multiplexing said selected wavelength into an output waveguide prior to amplifying.

14. The method of claim 11 wherein said demultiplexing is performed by a demultiplexer comprising:

an input waveguide for carrying the light from said broadband light source;

a plurality of intersecting waveguides intersecting with said input waveguide to form a plurality of intersections; and a plurality of switches disposed on said plurality of intersections.

15. The method of claim 14 wherein said plurality of switches disposed on said plurality of intersections selectively switches one of said plurality of wavelengths into an associated intersecting waveguide as said selected wavelength and for selectively transmitting the remaining ones of said plurality of wavelength channels.

16. The method of claim 14 wherein said switches comprise Bragg gratings that have a periodicity suitable for switching said one of said plurality of wavelengths from said input waveguide into an associated one of said intersecting waveguide.

17. The method of claim 14 wherein said switches can be engaged or disengaged to said input waveguide and an associated one of said intersecting waveguides.

18. The method of claim 14 wherein said demultiplexing comprises:

placing said light into an input waveguide;

placing an intersecting waveguide adjacent to said input waveguide, said intersecting waveguide or said input waveguide having a Bragg grating formed thereon, said input waveguide and said intersecting waveguide separated by a gap distance when in an off state; and displacing said Bragg grating sufficiently towards said input waveguide when in an on state such that said Bragg grating can selectively extract said selected wavelength.

19. The method of claim 18 wherein said Bragg grating has a periodicity suitable for extracting said one of said plurality of wavelengths into said intersecting waveguide.

20. The method of claim 18 wherein said displacing is performed by an electrically controllable microelectromechanical system (MEMS).

21. The method of claim 18 wherein displacing is performed by an electrostatic moving means for moving said Bragg grating for activating said Bragg grating.

22. A wavelength selective light source comprising:

a broadband light source producing light having a plurality of wavelengths;

a demultiplexer that receives the light and separates at least one of said plurality of wavelengths from said light, wherein said demultiplexer comprises:

(a) an input waveguide for carrying the light from said broadband light source;

(b) a plurality of intersecting waveguides intersecting with said input waveguide to form a plurality of intersections; and (c) a plurality of switches disposed on said plurality of intersections;

a multiplexer for coupling said at least one of said plurality of wavelengths into an output waveguide; and a semiconductor optical amplifier located after said multiplexer that receives said at least one of said plurality of wavelengths from said output waveguide, said semiconductor optical amplifier amplifying said at least one of said plurality of wavelengths and outputting an amplified output signal.

23. The wavelength selective light source of claim 22 wherein said broadband light source provides light in the range of 1520 to 1570 nanometers.

24. The wavelength selective light source of claim 22 wherein said plurality of switches disposed on said plurality of intersections selectively switches one of said plurality of wavelengths into an associated intersecting waveguide and for selectively transmitting the remaining ones of said plurality of wavelengths.

25. The wavelength selective light source of claim 22 wherein said switches comprise Bragg gratings that have a periodicity suitable for switching said one of said plurality of wavelengths from said input waveguide into an associated one of said intersecting waveguide.

26. The wavelength selective light source of claim 22 wherein said switches can be engaged or disengaged to said input waveguide and an associated one of said intersecting waveguides.

* * * * *